US 6,735,361 B2

(12) United States Patent
Gilliland et al.

(10) Patent No.: US 6,735,361 B2
(45) Date of Patent: May 11, 2004

(54) MODULAR WAVELENGTH DIVISION MULTIPLEXING (WDM) CONNECTOR

(75) Inventors: Patrick B. Gilliland, Chicago, IL (US); Scott C. Erickson, Bartlett, IL (US); Theodore E. Washburn, Barrington, IL (US); Berlin Ha, Naperville, IL (US); Sterling S. Rooke, Wheeling, IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/860,627

(22) Filed: Jun. 1, 2001

(65) Prior Publication Data

US 2004/0013368 A1 Jan. 22, 2004

(51) Int. Cl.⁷ .................................. G02B 6/34
(52) U.S. Cl. ................... 385/37; 498/84; 498/85
(58) Field of Search .................. 385/16, 18, 24, 385/37, 54, 55, 60

(56) References Cited

U.S. PATENT DOCUMENTS

| | | | | |
|---|---|---|---|---|
| 5,031,984 A | * | 7/1991 | Eide et al. | 385/27 |
| 5,163,114 A | * | 11/1992 | Hendow | 385/33 |
| 5,224,183 A | * | 6/1993 | Dugan | 385/24 |
| 5,317,663 A | * | 5/1994 | Beard et al. | 385/70 |
| 5,572,615 A | * | 11/1996 | Emori | 385/16 |
| 5,652,814 A | * | 7/1997 | Pan et al. | 359/124 |
| 5,841,562 A | * | 11/1998 | Rangwala et al. | 359/152 |
| 5,971,625 A | * | 10/1999 | Lu | 385/60 |
| RE36,820 E | | 8/2000 | McGinley et al. | 361/752 |
| 6,135,793 A | | 10/2000 | Babineau | 439/92 |
| 6,178,096 B1 | | 1/2001 | Flickinger et al. | 361/816 |
| 6,263,130 B1 | * | 7/2001 | Barnard | 385/24 |
| 6,341,025 B1 | * | 1/2002 | Mizrahi et al. | 359/130 |

OTHER PUBLICATIONS

SFF Committee proposed Specifications for GBIC (Gigabit Interface Converter) Rev. 5.5, Sep. 27, 2001, pp. 1–10.
Gigabit Interface Converter (GBIC) Revision 5.5 SFF document No.: SFF–8053, dated Sep. 27, 2000.

* cited by examiner

Primary Examiner—Tarifur R. Chowdhury
Assistant Examiner—Richard H Kim
(74) Attorney, Agent, or Firm—Karl D. Kovach

(57) ABSTRACT

A modular connector having multiple ports, comprising a housing having a first end and a second end, a first optical port on the first end, a second optical port on the first end, a third optical port on the second end, a fiber bragg grating (FBG) within the housing optically connected to the first port, said FBG configured to reflect a set wavelength back and away from the first port, a coupler within the housing optically connected to the FBG, the second port, and the third port; and wherein each of said optical ports, once connected, is capable of supporting the housing without additional support.

6 Claims, 8 Drawing Sheets

MODULAR WAVELENGTH DIVISION MULTIPLEXING (WDM) CONNECTOR

FIELD OF THE INVENTION

The present invention relates generally to optical connectors. More particularly, the present invention relates to a modular connector for an optical network including wavelength division multiplexing (WDM) capability.

BACKGROUND OF THE INVENTION

Due to the increasing electronic traffic on optical networks, maximizing bandwidth per each optical fiber utilized in transmitting optical signals is becoming a necessity. Optical fibers are capable of transmitting multiple wavelengths at various frequencies in order to maximize the amount of information that can be carried on a single optical fiber in a communication network. Of course, eventually particular wavelengths being carried on an optical fiber will need to be separated. The process of combining, transmitting, and separating signals of different wavelengths is referred to as wavelength division multiplexing (WDM).

Conventional WDM systems utilize numerous, bulky, discrete components that are connected using a myriad of optical fibers. If the number of wavelengths to be separated or added to an optical system is large, the amount of required discrete components dictates the use of a large enclosure to contain all the elements. WDM systems therefore require planning and close matching of laser characteristics with wavelength combiners (multiplexers) and separators (demultiplexers).

Accordingly, there is a need for a modular, inexpensive, and easy-to-use wavelength multiplexer (mux) and demultiplexer (demux) that is capable of being used selectively to reduce parallel fiber connections down to a single fiber link.

OBJECTS AND SUMMARY OF THE INVENTION

An object of the present invention is to provide a modular wavelength division multiplexing (WDM) connector capable of being retrofitted to existing parallel fiber connections.

A second objective of the present invention is to eliminate racks currently required for conventional WDMs in favor of a self-supportive connector or adapter.

A third object of the present invention is to reduce to the cost of WDM systems by integrating numerous discrete components into a single module.

A fourth object of the present invention is to reduce failures and defects associated with systems utilizing multiple discrete components.

A fifth object of the present invention is to provide the flexibility of a modular design to WDM systems based on individual laser transmitters.

In that regard, the present invention provides a modular connector having multiple ports, comprising a housing having a first end and a second end, a first optical port on the first end, a second optical port on the first end, a third optical port on the second end, a fiber Bragg grating (FBG) within the housing optically connected to the first port, said FBG configured to reflect a set wavelength back and away from the first port, a fiber coupler within the housing optically connected to the FBG, the second port, and the third port; and wherein each of said optical ports, once connected, is capable of supporting the housing without additional support.

DETAILED DESCRIPTION OF THE PREFERRED EMBODIMENTS

Figure 1:
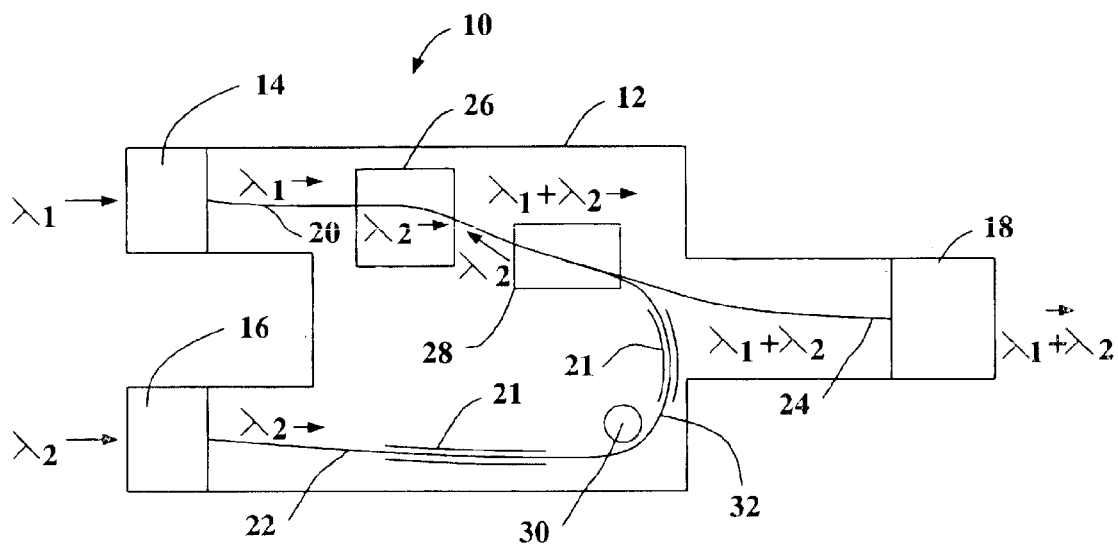
FIG. 1 is a functional diagram of a modular WDM connector configured in accordance with the present invention functioning as a wavelength coupler.

Referring now to the drawings, FIG. 1 shows a modular WDM connector 10 configured in accordance with the present invention. A housing 12 having connectors or ports 14, 16 and 18 is illustrated. The ports 14,16 are preferably SC singlemode optical connectors, such as those manufactured and sold by Stratos Lightwave, in Chicago, Ill. Port 18 is preferably an SC optical adapter, such as those manufactured by Corning Cable Systems, in Corning, N.Y. Of course, other optical connectors can be utilized for ports 14,16,18 in the present invention. For example, ports 14,16 can be LC optical connectors which are manufactured and sold by Stratos Lightwave in Chicago, Ill.

Port 14 is connected to optical fiber 20, and port 16 is connected to optical fiber 22. Port 18 is connected to optical fiber 24. A fiber Bragg grating 26 is attached to the optical fiber 20, such as manufactured by Gould Fiber Optics of Millersville, Md. Fiber Bragg gratings are also manufactured by Excelight, in Durham, N.C. A fiber optic bi-directional coupler 28 is optically connected to all the optical fibers 20,22,24. A fiber optic coupler, such as manufactured by Gould Fiber Optics, may be utilized in the present invention for the bi-directional coupler 28.

A post or support member 30 is provided to prevent the optical fiber 22 from breaking or being damaged due to overbending at an arc or bend 32 in optical fiber 22.

Furthermore, a channel, groove, or second support member 21 also functions to properly position the optical fiber 21 within the housing 12.

The housing 12 is preferably constructed of plastic or other polymer that may be molded to a desired shape. The fiber Bragg grating 26 and the fiber optic bi-directional coupler 28 are preferably secured within the housing 12 by using an adhesive or support brackets formed into the housing 12. Similarly, the ports 14,16,18 are attached to the housing 12 by using an adhesive or via support brackets formed into the housing 12.

As shown in FIG. 1, a first wavelength ($\lambda_1$) and a second wavelength ($\lambda_2$) enter the connector 10 via optical ports 14 and 16, respectively. $\lambda_1$ is carried along optical fiber 20 into and through the fiber Bragg grating (FBG) 26 to the coupler 28. $\lambda_2$ is carried along optical fiber 22 and into and through the bi-directional coupler 28. The FBG 26 is configured to reflect $\lambda_2$ while allowing other wavelengths to pass though the FBG 26. Accordingly, $\lambda_2$ is reflected back from the FBG 26 and towards coupler 28 along optical fiber 24. $\lambda_2$ passes though the coupler 28 and exits the coupler 28 via optical fiber 24 towards optical port 18. $\lambda_1$ simply continues along fiber 20, through the FBG 26, into the bi-directional coupler 28. $\lambda_1$ then exits the coupler 28 on fiber 24 towards the optical port 18. In this manner $\lambda_1$ and $\lambda_2$ are combined to be carried along fiber 24 and exit the connector 10 via port 18. $\lambda_1$ also travels down fiber 22 and exits connector 16.

Using the FBG 26 in combination with the bi-directional coupler 28 is preferred over an optical splitter/coupler which simply adds wavelengths from separate fibers to a single fiber. An FBG in combination with a bi-directional coupler enables wavelengths having very close frequencies to be accurately combined to and/or divided from a single optical fiber. Conventional optical splitters/couplers are unable to accurately add or subtract wavelengths having very close frequencies from a single optical fiber.

Figure 1A:
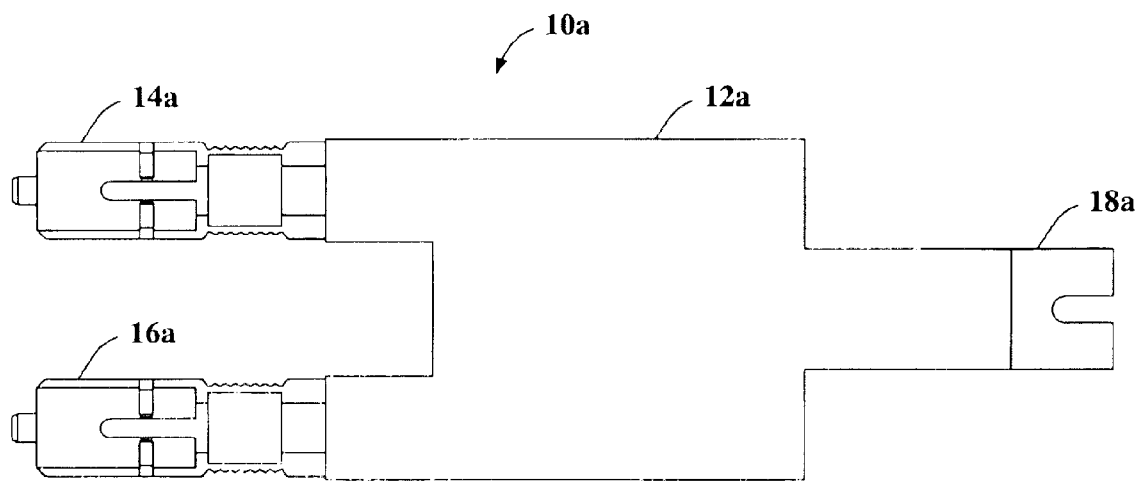
FIG. 1a is a plan view of the modular WDM connector diagrammed in FIG. 1.

FIG. 1a illustrates a connector 10a having a housing 12a that is configured to accommodate an SC configuration. Ports 14a and 16a include male SC connectors. Port 18a includes an SC adapter.

Figure 1B:
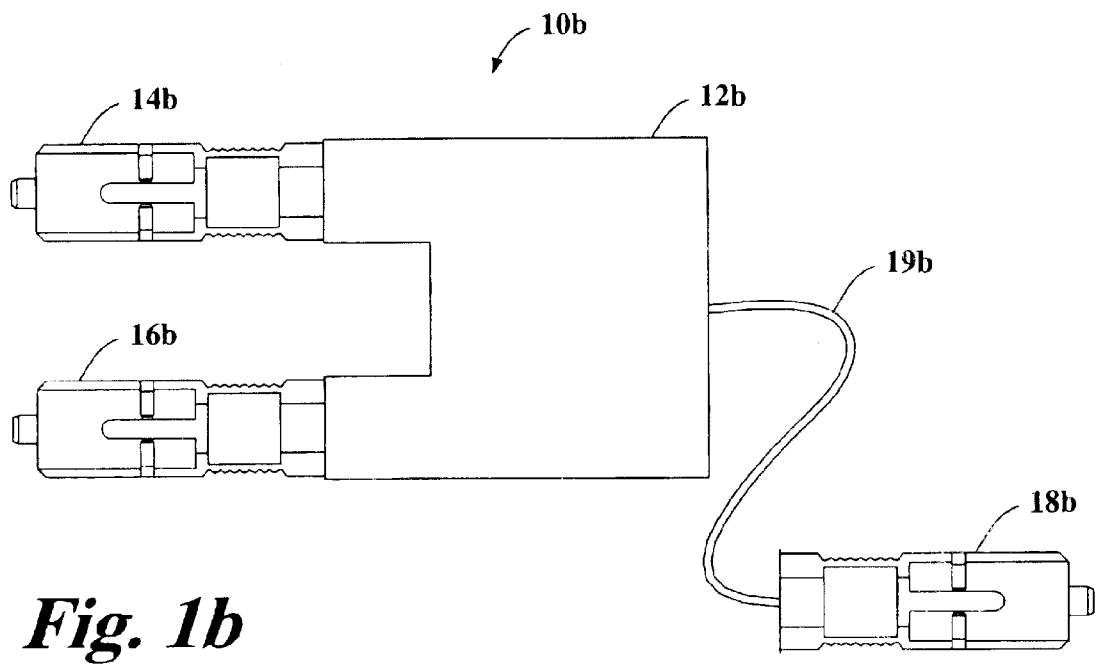
FIG. 1b is a plan view of a modular WDM connector providing a pig-tailed or cable-ended configuration in accordance with a second embodiment of the present invention.

FIG. 1b illustrates a connector 10b having a housing 12b configured in accordance with a second embodiment of the present invention. The ports 14b and 16b include male SC connectors. Port 18b also includes a male SC connector. In accordance with the second embodiment of the present invention, the port 18b is attached to the housing 12b using a pig-tailed or cabled ended configuration via an optical cable 19b.

Figure 1C:
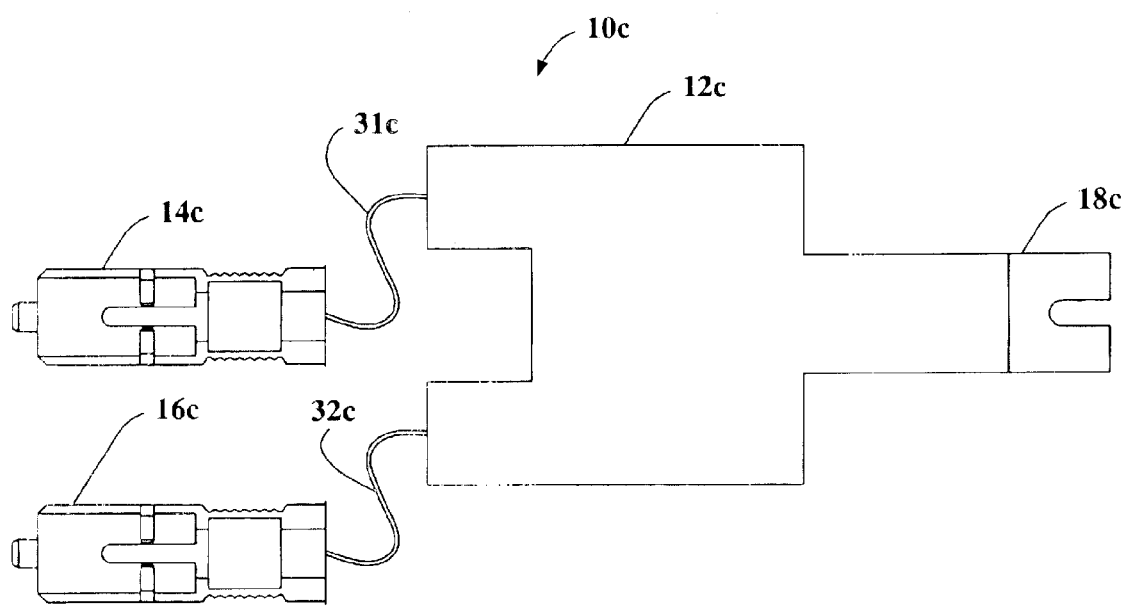
FIG. 1c is a plan view of a modular WDM connector providing a pig-tailed or cable-ended configuration in accordance with a third embodiment of the present invention.

FIG. 1c illustrates a connector 10c having a housing 12c configured in accordance with a third embodiment of the present invention. The ports 14c and 16c include male SC connectors. Port 18c includes an SC adapter. In accordance with the third embodiment of the present invention, the ports 14c and 16c are attached to the housing 12c using a pig-tailed or cabled ended configuration via optical cables 31c and 32c, respectively.

Figure 1D:
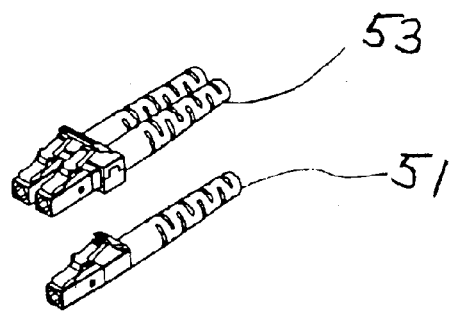
FIG. 1d illustrates an LC connector and adaptor that may be utilized on the ports of the present invention.
Figure 1D:
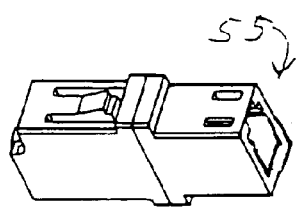
Figure 1D:
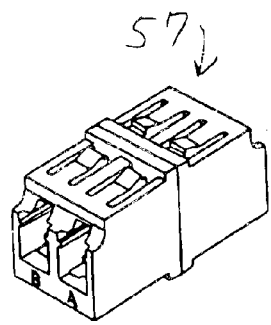

FIG. 1d illustrates an LC simplex connector 51, an LC duplex connector 53, an LC simplex adapter 55, and an LC duplex adapter 57. The ports of the present invention can be modified to accommodate an LC configuration using such connectors and adapters.

Figure 2:
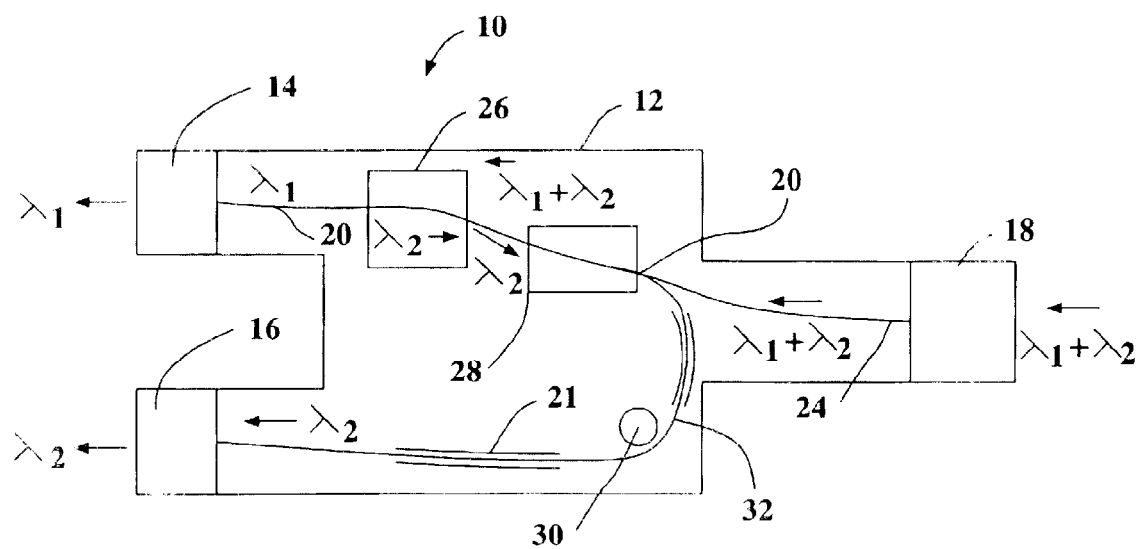
FIG. 2 is a functional diagram of a modular WDM connector shown in FIG. 1 functioning as a wavelength divider.

FIG. 2 illustrates the WDM connector 10 functioning to separate multiple wavelengths from a single fiber, instead of adding multiple wavelengths to a single fiber as shown in FIG. 1. The connector 10 shown in FIG. 2 is identical in structure as the WDM connector 10 shown in FIG. 1. The only difference is the WDM connector shown in FIG. 2 functions to separate multiple wavelengths entering on a fiber connected to port 18. As such, $\lambda_1$ and $\lambda_2$ enter the connector 10 via port 18 and are both carried along single optical fiber 24. $\lambda_1$ and $\lambda_2$ both enter the bi-directional coupler 28, pass though the bi-directional coupler 28, and exit the bi-directional coupler via fiber 20. $\lambda_1$ and $\lambda_2$ both enter the FBG 26, but only $\lambda_1$ passes though the FBG 26 and out port 14. $\lambda_2$ is reflected back towards and into the bi-directional coupler 28 by the FBG 26, and $\lambda_2$ exits the out the coupler 28 via fiber 32 and out port 16. In this manner, the WDM connector 10 functions to separate multiple wavelengths from a single fiber.

Figure 3:
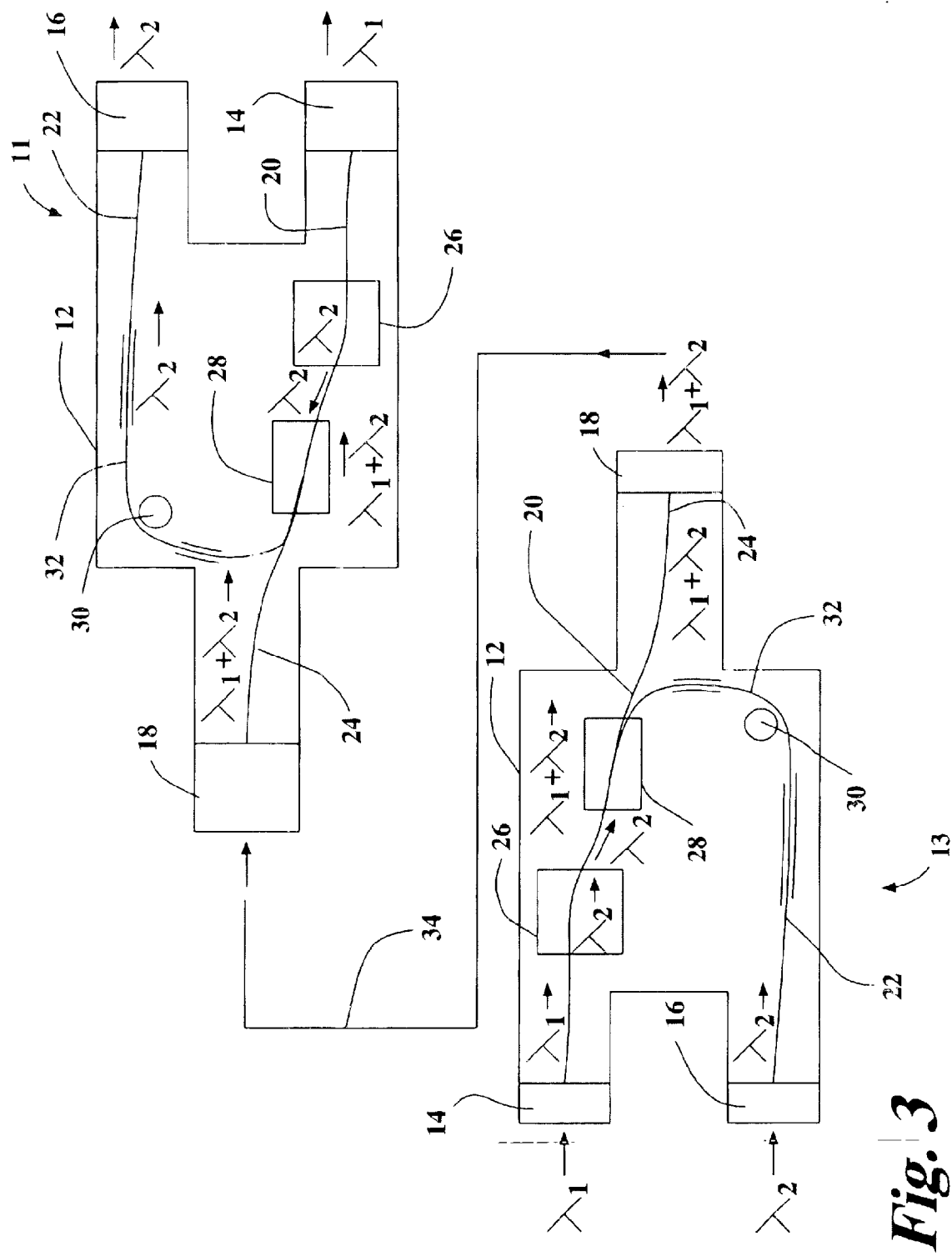
FIG. 3 is a functional diagram of a pair of modular WDM connectors for coupling two different wavelengths at a transmitting end, transmitting the wavelengths over a single optical fiber, and separating the wavelengths with a pair of modular WDM connector at a receiving end in accordance with the present invention.

FIG. 3 illustrates how two WDM connectors configured in accordance with the present invention can be integrated into a communication system to combine multiple wavelengths onto a single optical fiber 34, transmit multiple wavelengths a distance over the single fiber 34, and then separate the multiple wavelengths at the receiving end using the WDM connector. In FIG. 3 two WDM connectors 11 and 13 are shown. Connectors 11 and 13 are structurally identical to the WDM connectors 10 shown in FIGS. 1 and 2, but are identified in FIG. 3 as the connectors 11 and 13 to distinguish between the transmitting connector 11 and the receiving connector 13. Connector 11 operates as discussed in reference to connector 10 in FIG. 1, and connector 13 operates as discussed in reference to connector 10 in FIG. 2.

Figure 4:
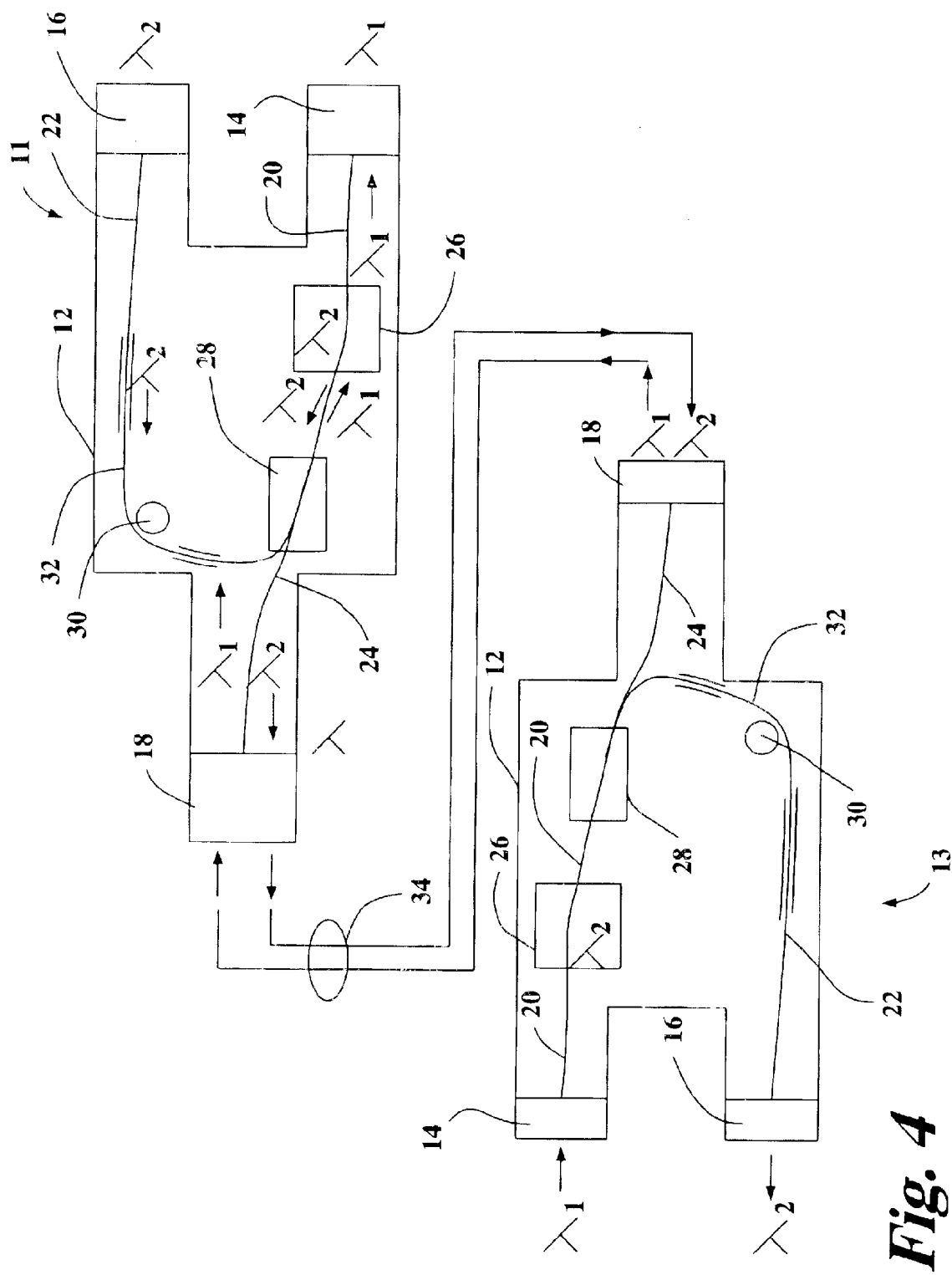
FIG. 4 is a functional diagram of a pair of modular WDM connectors configured in accordance with the present invention enabling full-duplex transmission of multiple wavelengths over a single optical fiber.

FIG. 4 illustrates how two WDM connectors 11 and 13 configured in accordance with the present invention can be combined to enable full-duplex communication over a single optical fiber 34 using two different wavelengths, $\lambda_1$ and $\lambda_2$. Once again, connectors 11 and 13 are identical, and operate as discussed in reference to FIG. 3. The only difference in FIG. 4 is that connectors 11 and 13 are both simultaneously operating as transmitters and receivers, and as dividers and couplers.

Figure 5:
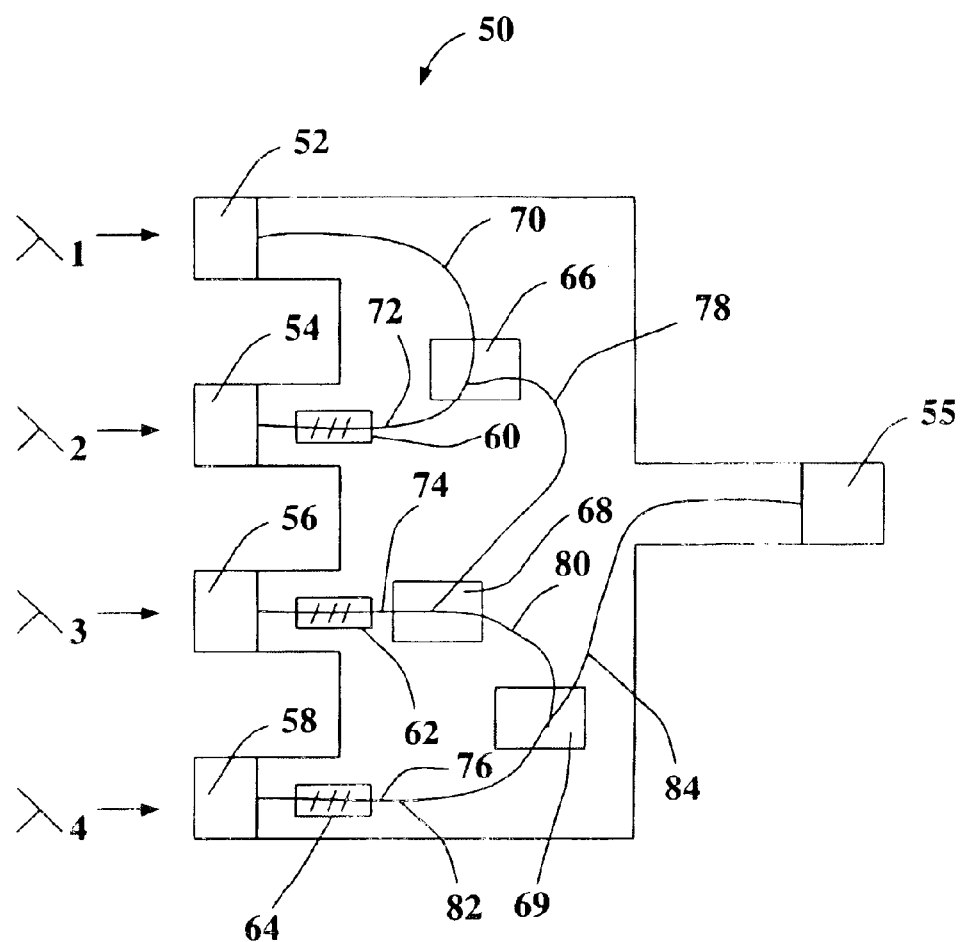
FIG. 5 is a functional diagram of a modular WDM connector configured in accordance with a fourth embodiment of the present invention.

FIG. 5 illustrates a WDM connector 50 constructed in accordance with a fourth embodiment of the present invention. The WDM connector 50 operates in the same manner as the WDM 10 connector discussed in FIGS. 1–4, except the number of ports 52,54,56,58 is increased from two to four. In this manner four different wavelengths can be combined into a single fiber 84 that exits out the port 55. In this case FBGs 60,62,64 are tuned to pass wavelengths $\lambda_2$, $\lambda_3$, $\lambda_4$, respectively. It should be clear that more or less ports may be added to accommodate the number of unique wavelengths being utilized. Similarly, it should be clear that the WDM connector 50 can function as either a coupler to combine multiple wavelengths to a single optical fiber, or as a divider to separate multiple wavelengths from a single optical fiber.

Figure 6:
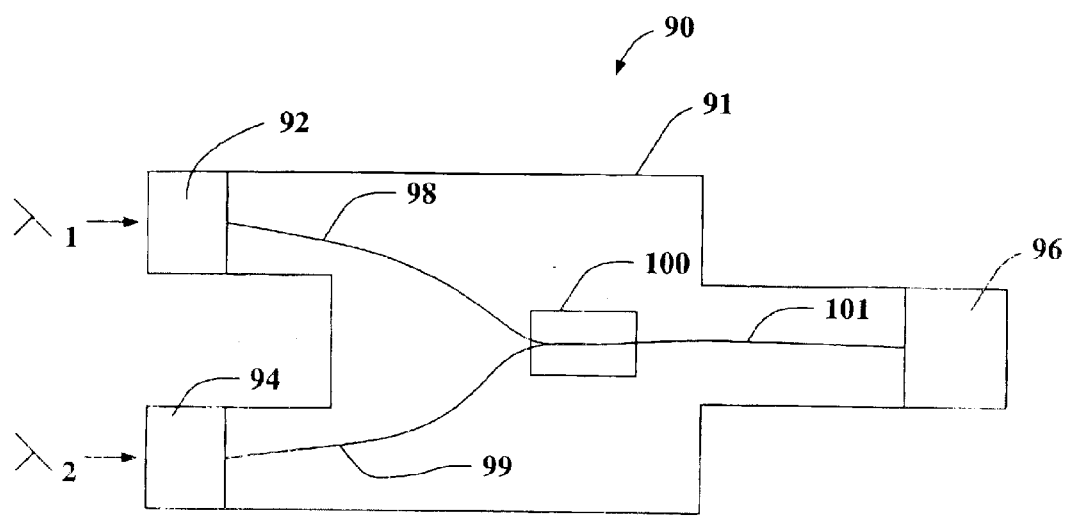
FIG. 6 is a functional diagram of a modular WDM connector configured in accordance with a fifth embodiment of the present invention.

FIG. 6 illustrates a connector 90 configured in accordance with a fifth embodiment of the present invention. The connector 90 is designed to provide a compact optical module for multiple wavelengths that are not very close together in frequencies, or do not require the efficiency and accuracy of a WDM module using an FBG. The connector 90 has two input ports 92 and an output port 96. $\lambda_1$ and $\lambda_2$ enter the module through respective ports 92,94 and are combined via a conventional optical coupler 100, such as produced by Gould Fiber Optics. The combined wavelengths $\lambda_1$ and $\lambda_2$ exit the module 90 on a single fiber 101 via port 96. Of course, more input ports can be added to the modular connector 90.

Figure 7:
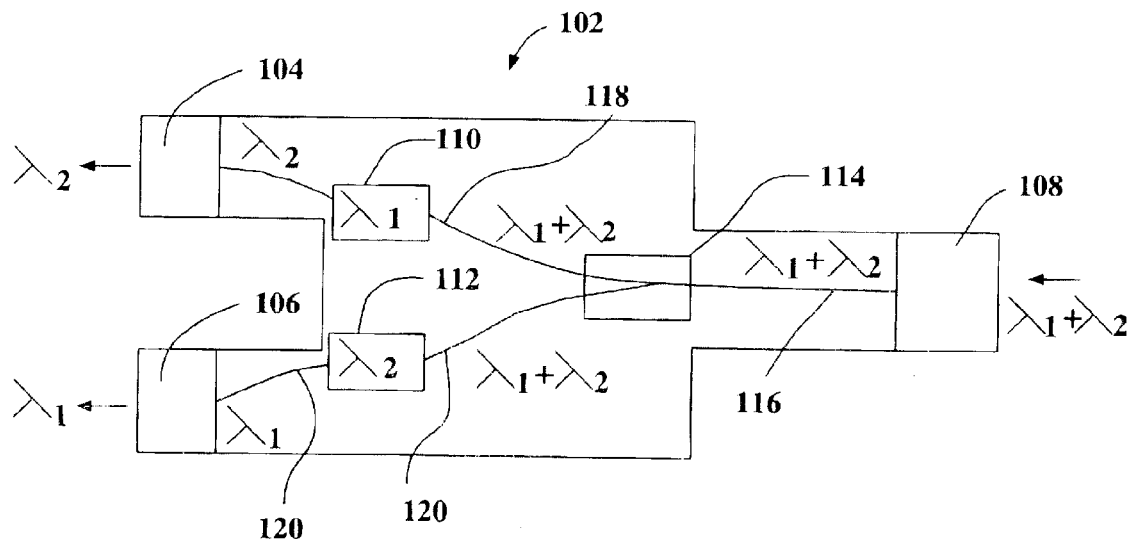
FIG. 7 is a functional diagram of a modular WDM connector configured in accordance with a sixth embodiment of the present invention.

FIG. 7 illustrates a connector 102 constructed in accordance with a sixth embodiment of the present invention.

Similar to the connector 90 shown in FIG. 6, the connector 102 is designed to provide a compact optical divider module for multiple wavelengths that are not very close in frequencies, or do not require the efficiency and accuracy of a WDM using an FBG. For example, WDMs combined with FBGs can discriminate between wavelengths as close as 0.8 nanometers. Conventional couplers or splitters are designed to manipulate wavelengths having larger discrepancies, such as 1310 nm, 1480 nm, and 1550 nm.

Operationally, wavelengths $\lambda_1$ and $\lambda_2$ enter the divider connector 102 via port 108 along single optical fiber 116. $\lambda_1$ and $\lambda_2$ enter and exit splitter 114 via both fibers 118 and 120. The splitter 114 is of conventional design such as produced by Gould Fiber Optics. $\lambda_1$ and $\lambda_2$ both enter wavelength filters 110 and 112 via optical fiber 118 and 120, respectively. Filter 110 prevents $\lambda_1$ from passing and thus allows only $\lambda_2$ to continue on to the port 104. Similarly, filter 112 prevents $\lambda_2$ from passing and thus allows only $\lambda_1$ to continue on to port 106. In this manner a compact divider module is provided for separating multiple wavelengths from a single fiber.

It is to be understood that the foregoing description is merely a disclosure of particular embodiments and is no way intended to limit the scope of the invention. Several possible alterations and modifications will be apparent to those skilled in the art.

We claim as out invention:

1. A device comprising:
    a housing made of a polymer material;
    a first optical port on the housing, the first optical port having a first optical connector for mating with a first complimentary optical connector, and wherein the first optical connector carries only a first wavelength;
    a second optical port on the housing, the second optical port having a second optical connector for mating with a second complimentary optical connector, and wherein the second optical connector carries only a second wavelength;
    a third optical port on the housing, the third optical port having a third optical connector for mating with a third complimentary connector, and wherein the third optical connector carries only both the first wavelength and the second wavelength;
    a fiber bragg grating within the housing optically connected to the first optical port, said fiber bragg grating configured to reflect a set wavelength back and away from the first optical port, and wherein the set wavelength is substantially the same as the second wavelength;
    an optical coupler within the housing optically connected to the fiber bragg grating, the second optical port, and the third optical port;
    a first optical fiber optically associating the first optical port to the fiber bragg grating;
    a second optical fiber optically associating the second optical port to the optical coupler;
    a third optical fiber optically associating the third optical port to the optical coupler;
    a post formed in the housing for positioning the second optical fiber; and
    a channel formed in the housing for positioning the second optical fiber.

2. The device of claim 1, wherein the first and second connectors are SC connectors.

3. The device of claim 2, wherein a distance between inputs of the SC connectors on the first and second optical ports is substantially 13.5 millimeters.

4. The device of claim 1, wherein the third optical port includes an SC adapter.

5. The device of claim 1, wherein the first and second optical connectors are LC connectors.

6. The device of claim 1, wherein the third optical port includes an LC adapter.

* * * * *